(12) United States Patent
Barberan Latorre (10) Patent No.: US 12,304,136 B2
(45) Date of Patent: May 20, 2025

(54) METHOD FOR PRODUCING A THREE-DIMENSIONAL STRUCTURE ON A SURFACE OF A FLAT SUBSTRATE, RESULTING SUBSTRATE, AND DEVICE FOR PRODUCING THE SUBSTRATE ACCORDING TO THE METHOD

(71) Applicant: Jesus Francisco Barberan Latorre, Castelldefels (ES)

(72) Inventor: Jesus Francisco Barberan Latorre, Castelldefels (ES)

( * ) Notice: Subject to any disclaimer, the term of this patent is extended or adjusted under 35 U.S.C. 154(b) by 509 days.

(21) Appl. No.: 17/288,734

(22) PCT Filed: Oct. 31, 2018

(86) PCT No.: PCT/ES2018/070705
§ 371 (c)(1),
(2) Date: Apr. 26, 2021

(87) PCT Pub. No.: WO2020/089491
PCT Pub. Date: May 7, 2020

(65) Prior Publication Data
US 2021/0394431 A1   Dec. 23, 2021

(51) Int. Cl.
*B29C 64/112* (2017.01)
*B05D 1/32* (2006.01)
(Continued)

(52) U.S. Cl.
CPC ............ *B29C 64/112* (2017.08); *B05D 1/322* (2013.01); *B05D 7/536* (2013.01); *B29C 64/30* (2017.08);
(Continued)

(58) Field of Classification Search
CPC ...................................................... B05D 1/322
See application file for complete search history.

(56) References Cited

U.S. PATENT DOCUMENTS

| 2004/0007454 A1* | 1/2004 | Gador | G11B 5/102 |
| | | | 204/192.16 |
| 2004/0235992 A1* | 11/2004 | Okada | C08F 283/04 |
| | | | 524/115 |

(Continued)

FOREIGN PATENT DOCUMENTS

| EP | 1872959 A1 | 1/2008 |
| EP | 3109056 A1 | 12/2016 |

(Continued)

OTHER PUBLICATIONS

Espacenet Translation of Specification for JP S58-163474 (Year: 1982).*

(Continued)

*Primary Examiner* — Francisco W Tschen
(74) *Attorney, Agent, or Firm* — LUCAS & MERCANTI, LLP (57) ABSTRACT

A method for producing a three-dimensional structure on a surface of a flat substrate, a device for implementing the method, and the substrate that can be produced, the method providing the substrate with the surface ready to be treated; applying a relief product in the form of droplets on the surface, such that selected areas of droplets are produced on the surface; applying a covering product to the surface such that it forms a layer over the surface; and fixing the layer of the covering product with the selected areas on the surface being free from the covering product.

14 Claims, 5 Drawing Sheets

(51) Int. Cl.
*B05D 7/00* (2006.01)
*B29C 64/30* (2017.01)
*B33Y 10/00* (2015.01)
*B33Y 30/00* (2015.01)
*B33Y 40/20* (2020.01)

(52) U.S. Cl.
CPC .............. *B33Y 10/00* (2014.12); *B33Y 30/00* (2014.12); *B33Y 40/20* (2020.01)

(56) References Cited

U.S. PATENT DOCUMENTS

| | | | |
|---|---|---|---|
| 2005/0026421 A1* | 2/2005 | Tanaka | H10K 71/611 |
| | | | 257/E21.585 |
| 2005/0202348 A1* | 9/2005 | Nakayama | H10K 77/10 |
| | | | 430/311 |
| 2011/0303113 A1 | 12/2011 | Sarkisian et al. | |
| 2012/0171807 A1* | 7/2012 | Berger | H01L 31/1876 |
| | | | 118/679 |
| 2013/0019918 A1* | 1/2013 | Boukai | H01L 21/30604 |
| | | | 438/54 |
| 2013/0286088 A1 | 10/2013 | Ryberg et al. | |
| 2015/0210055 A1* | 7/2015 | Pervan | C09D 11/38 |
| | | | 524/388 |
| 2016/0250835 A1 | 9/2016 | Pervan | |

FOREIGN PATENT DOCUMENTS

| | | |
|---|---|---|
| ES | 2586981 A1 | 10/2016 |
| JP | S58163474 A | 9/1983 |
| WO | 2014170515 A1 | 10/2014 |
| WO | 2018069874 A1 | 4/2018 |

OTHER PUBLICATIONS

International Search Report for PCT/ES2018/070705 dated Apr. 29, 2019 and English translation; 8 pages.

* cited by examiner

Fig. 9

METHOD FOR PRODUCING A THREE-DIMENSIONAL STRUCTURE ON A SURFACE OF A FLAT SUBSTRATE, RESULTING SUBSTRATE, AND DEVICE FOR PRODUCING THE SUBSTRATE ACCORDING TO THE METHOD

CROSS REFERENCE TO RELATED APPLICATION

This application is a 371 of PCT/ES2018/070705 filed on Oct. 31, 2018, which is incorporated herein by reference.

TECHNICAL FIELD

The present invention is related to the industry dedicated to generating reliefs, and more specifically to the industry dedicated to producing layers with 3D structures on substrates by means of digital printing.

STATE OF THE ART

Currently, forming 3D reliefs or structures on substrates is known, the substrates being configured as panels and being made of a material which can be selected, for example, from wood (chipboard, medium-density fibres "MDF", high-density fibres "HDF" or plywood), plastic (PVC), cellulose-based materials (paper or cardboard) and metal.

Nowadays, in order to obtain a good result when reproducing natural materials, such as wood or stone, in addition to the image, it is necessary to reproduce the 3D surface structure of said natural materials in order to obtain a high similarity also to the touch.

A known solution comprises first applying a material in the form of a film on a surface of the substrate, in order to then exert pressure on said surface of the substrate through a pressure element such as a mould, a roller or similar. The pressure element has an engraving, which by means of pressure is transferred inversely to the surface of the substrate, and more specifically to the film applied thereon.

A major drawback, among others, of this solution resides in that it is not very flexible since in order to change the engraving to be transferred to the substrate, the corresponding pressure element has to be changed.

Other known solutions, which provide flexibility in the reproduction of reliefs, comprise applying on the corresponding surface of the substrate a layer of a first product or a first substance in a liquid state, or at least partially liquid, whereon droplets of a second product or a second substance are projected.

According to the solution known through document EP3109056A1, the droplets of the second product impact against the surface area of the first product causing a sinking or recess through the thickness of this first product. Once the drying or curing of said products is carried out, a surface area is produced on said surface of the substrate with reliefs or 3D structures.

According to the solution known through document WO2018/069874A1, the droplets of the second product are deposited or applied on the layer formed by the first product such that, depending on the features of said two products, the droplets penetrate to a greater or lesser degree through said layer. In this manner, once the drying or curing of the two products is carried out, a surface area is produced on said surface of the substrate with reliefs or 3D structures, with a greater or lesser depth.

In order to represent, for example, a wooden plank with grain or a stone slab with cracks, the changes in the thickness of the first product layer must coincide as much as possible with the area of said grain or cracks, according to the image included before or after the application of the first product and/or the second product.

In this sense, the solutions described that project or eject the droplets of the second product onto the layer formed by the first product are highly complex, while being at least partially ineffective, from the point of view of precision when locating the changes in the thickness of the layer by means of arrangement of the droplets given the interaction of the droplets with a medium which is at least partially liquid.

In this sense, when using these solutions, great precision must be used in the calculation of the ejection points of the droplets on the layer and the angle of incidence of said droplets when they make contact with the first product, in addition to the injection action itself regarding size and properties of both products.

Aspects such as the properties of the two products and the thickness of the layer formed by the first of the products must be considered in each case in order to foresee the possible displacements undergone by the second products once they interact in the form of droplets through the layer of the first product until they are arranged according to the final positioning thereof, and therefore the exact reduction point of the thickness of the layer. There is a high complexity when evaluating the interaction of one product which hits another, and more so at high printing speeds.

In view of the described disadvantages or limitations of currently existing solutions, a solution is necessary which offers a high flexibility when changing the relief to be produced on the corresponding substrate, in addition to providing greater precision in the arrangement of the reliefs and a reduction in the degree of complexity in the calculations for the application of the products to be used.

OBJECT OF THE INVENTION

In order to meet this objective and solve the technical problems commented so far, in addition to providing additional advantages which may be derived later on, the present invention provides a method for producing a three-dimensional structure on a surface of a flat substrate, a device for implementing the method and a substrate that can be produced by implementing said method.

The method comprises the following steps:
providing the substrate with the surface ready to be treated;
applying a relief product, preferably by means of injection heads, in the form of droplets on the surface, such that selected areas of the droplets are produced on the surface;
applying a covering product to the surface such that it forms a layer over the surface;
fixing the layer of the covering product with the selected areas on the surface being free from the covering product.

According to the method, energy is applied by carrying out said fixing by means of drying the layer of the covering product.

The relief product comprises properties which provide a delaying effect in the drying such that the drying time of the relief product is longer than that of the covering product.

Preferably as an alternative to supplying the delaying effect in the drying of the relief product, the relief product and the covering product comprise properties such that they are immiscible with each other in order to generate a removal of the covering product in correspondence with the droplets of the relief product.

According to the method, after fixing the layer of the covering product, the relief product is maintained on the surface or is removed. If it is removed after fixing the layer of the covering product, said relief product is preferably removed through a brushing or an application of compressed air. Alternatively, the relief product is removed during the fixing of the layer of the covering product.

According to the method, the layer of the covering product being fixed, a protective product is applied to the surface. In this manner, the protective product can cover or be arranged on the covering product and can be arranged on the selected areas free from the covering product, with or without the relief product in between them.

Subsequently to the application of the covering product, a fixing of said protective product is carried out.

The relief product is selected from ink, silicone, varnish, lacquer, water-based liquid, solvent-based liquid and any combination of the previous, in other words, two or more of any of the above. The ink is preferably transparent. The covering product, on the other hand, is preferably lacquer or varnish.

The substrate that can be produced by means of the method according to what has been described comprises the selected areas free from the covering product on the surface thereof. In this manner, the substrate comprises the three-dimensional structure on the surface thereof.

The device for producing the mentioned substrate comprises injection heads for applying the relief product in the form of droplets on a surface of the substrate, first fixing means for drying the relief product, means for applying the covering product on the surface of the substrate, second fixing means for drying the covering product, means for applying the protective product, third fixing means for drying the protective product and a control unit configured to apply the method as described.

The first fixing means, the second fixing means and/or the third fixing means may be the same or different from each other, the properties and nature of the relief product, the covering product and the protective product being that which determine it.

DETAILED DESCRIPTION OF THE INVENTION

The present invention relates to a method for producing a three-dimensional structure on a surface (1') of a flat substrate (1), to the substrate (1) that can be produced by implementing said method and to a device for producing or manufacturing said substrate (1) by implementing said method.

The present method enables a better definition of the three-dimensional structure, a higher precision in the arrangement of the reliefs or changes in depth in the external surface area of the surface (1') and a better control of the depth in recesses or reductions in thickness to be produced, in turn reducing the degree of complexity in the calculations and in the application of substances or products to be applied. In this manner, the substrate (1) produced has a higher quality in the definition thereof in terms of the relief or the three-dimensional structure.

Figure 1:
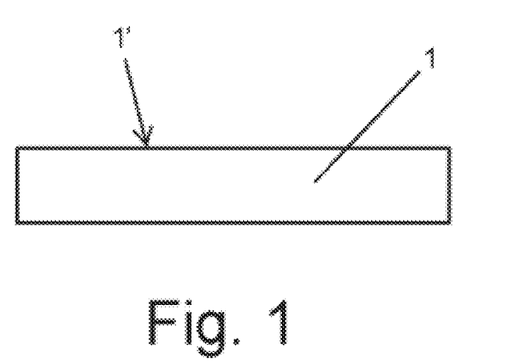
FIG. 1 shows a schematic view of a substrate.

The substrate (1) is flat since it has at least the surface (1') to be treated as flat in order to arrange the three-dimensional structure thereon, which can be seen, for example, in FIG. 1. The substrate (1) is preferably configured as a panel, plank or slab of a material which can be selected, for example, from wood (chipboard, medium-density fibres "MDF", high-density fibres "HDF" or plywood), plastic (PVC), cellulose-based materials (paper or cardboard) and metal.

According to the method, the substrate (1) is arranged in relation to the device used to carry out the method such that the surface (1') is in the arrangement to receive a first relief product (2). The relief product (2) is selected from ink, which is preferably transparent, silicone, varnish, lacquer, water-based liquid, solvent-based liquid and any combination of the above, in other words, between some or all of the above.

For the application of the relief product (2), the device comprises injection heads such that by means of the use of inkjet digital printing technology, said heads apply or eject the first relief product (2) on the surface (1').

A print or a preparation layer can be arranged on the substrate (1), and more specifically directly on the surface (1') thereof. Both the print and said preparation layer are considered as part of the thickness of the substrate (1) itself, since the relief product (2) is arranged on them, not being absorbed to any extent. In other words, neither the substrate (1), nor the print, nor the preparation layer absorb the relief product (2) such that when said relief product (2) is applied, it remains on them, without moving through them.

In this manner, "substrate (1)" corresponds to the substrate (1) free from the print and from the preparation layer or the substrate (1) including either said print or said preparation layer.

The relief product (2), and more specifically the droplets thereof, determine the changes in thickness of the final substrate (1) produced, in other words, it determines slits or recesses in a final external surface area of the substrate (1) produced. The relief product (2) covers only selected areas. These selected areas correspond to specific and isolated areas, in other words, leaving a portion of the surface (1') of the substrate (1) uncovered or not covered.

Figure 2:
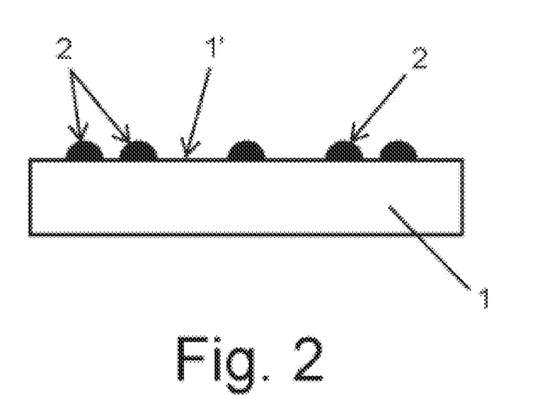
FIG. 2 shows a schematic view of the substrate with droplets of a first product on a surface thereof.

Thus, the method comprises applying the relief product (2) in the form of droplets on the surface (1') of the substrate (1). In this manner, the relief product (2) is arranged according to the described selected areas on said surface (1'). In FIG. 2, it can be seen that the substrate (1) with the droplets of the relief product (2) arranged as described on the surface (1') of the substrate (1).

The selected areas of the droplets of the relief product (2) can correspond with a selection of the areas in order to correspond to specific identifiable areas on the print or the preparation layer. The relief product (2) covers only specific and isolated areas, in other words, it leaves portions of the surface (1') of the substrate (1), of the print or the preparation layer uncovered or not covered. In this manner, the production of the three-dimensional structure can be synchronised with the drawings or the identifiable specific areas in the print or the preparation layer.

Alternatively, the selected areas of the droplets of the relief product (2) can correspond to a selection of the areas with shapes that are random.

Accordingly, and regardless of whether the substrate (1) has the print or the preparation layer, the application of the droplets of the relief product (2) is done corresponding exactly to the area point of the slits or the recesses in the final external surface area of the substrate (1) produced since said product (2) is arranged such that it is prevented from undergoing displacements through other products. This is due to the application of the relief product (2) on the substrate (1), without passing through any film of another substance, preventing an interaction therewith from modifying the application point.

This improves the precision in the area of said slits, in addition to entailing a significant simplification in terms of calculations in the configuration of the application or ejection of the droplets of the relief product (2).

Optionally, the droplets of the relief product (2) are at least partially dried or cured such that they reach at least a semi-solid or gelling state. This contributes to fixing, even to a greater extent, the positioning of said droplets on the surface (1') of the substrate (1) established precisely and directly by means of the application or ejection of the droplets of the relief product (2) on the substrate (1).

Next, the method, after the application of the relief product (2), comprises applying a covering product (3) on the substrate (1) entailing an increase in the thickness of the substrate (1). Said covering product (3) is applied such that it forms a layer on the surface (1'). Accordingly, the covering product (3) is applied both in correspondence with the droplets and in correspondence with the portions of the surface (1') of the substrate (1) free from the relief product (2), such that said covering product (3) remains around the droplets and on said surface (1').

For this application, the device used to carry out the method comprises application means. The application means of the covering product (3) can be selected from, among others, injection heads that use digital inkjet printing technology, spray guns and rollers.

Figure 3:
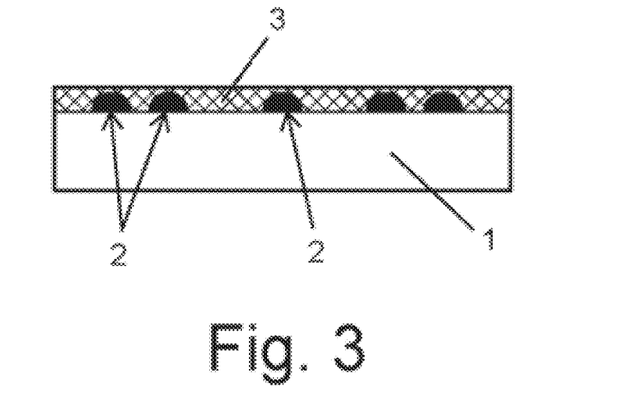
FIGS. 3 and 4 show schematic views of the substrate with the droplets and a layer of a second product according to two different thicknesses of said layer.
Figure 4:
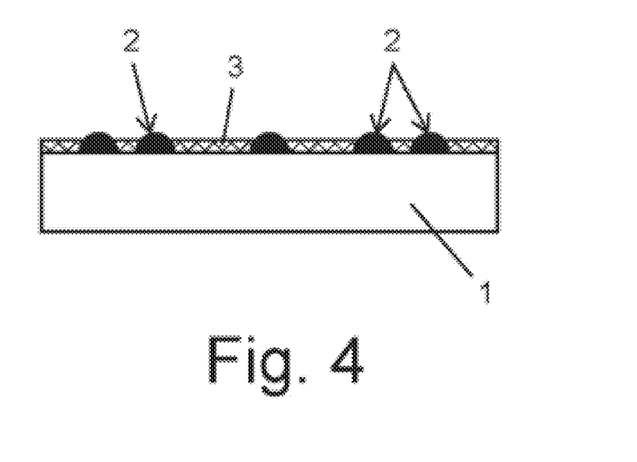

The covering product (3), by way of a preferred example, is a lacquer or a varnish. In turn, said product (3) is preferably UV-radiation curing. Said covering product (3) is applied in a liquid state according to level measurements, preferably two. A first level measurement is determined when the thickness thereof on the surface (1') reaches or even exceeds the thickness of the droplets of the relief product (2) on the surface (1'), as seen, for example, in FIG. 3. A second level measurement is determined when the thickness thereof on the surface (1') is less than the thickness of the droplets of the relief product (2) on the surface (1'), as seen, for example, in FIG. 4. Both FIG. 3 and FIG. 4 show the arrangement in the form of a layer of the covering product (3) after the application thereof on the surface (1') of the substrate (1).

Optionally, the covering product (3) applied is at least partially dried or cured such that it reaches at least a semi-solid or gelling state. This contributes to fixing the relative positioning of said covering product (3) with respect to the droplets of the relief product (2).

Next, the method preferably comprises allowing a generation of reactions, physical and chemical, to take place between the relief product (2) and the covering product (3) due to interaction with each other. These reactions give rise to a removal or a displacement of the covering product (3) in correspondence with the droplets of the relief product (2), in other words, the covering product (3) is displaced away from the relief product (2).

This is mainly due to the fact that the covering product (3) and the relief product (2) have physical and/or chemical features which do not make them miscible with each other, in other words, they are immiscible, thereby generating a rejection reaction or effect and a consequent physical separation, mainly due to the differences in surface tension between them. In other words, the surface tension of the relief product (2) may be greater than that of the covering product (3) or the surface tension of the covering product (3) may be greater than that of the relief product (2). The method comprises selecting these products (2, 3) such that they are immiscible with each other.

Accordingly, and as has been verified, the relief product (2) tends to have a surface tension considerably lower than the surface tension of the covering product (3). By way of example, the method may comprise selecting a silicone as the relief product (2) and a varnish as the covering product (3). By way of another example, the method may comprise selecting an ink, preferably transparent, as the relief product (2) and a lacquer as the covering product (3). Also by way of example, the ink could be combined with the varnish and the silicone with the lacquer.

Additionally, the method may comprise the use of additives such that a control is performed on the surface tension of both products (2, 3) such that two products (2, 3) which are not miscible with each other are produced, giving rise to the previously described rejection effect. Accordingly, said products (2, 3) can be the same product or substance; in other words, having the same or substantially the same composition in the absence of the additives.

In this manner, and giving only the varnish as an example, although it can be used in the case of any of the other products mentioned, in the method a first varnish is selectable and usable as the relief product (2) and a second varnish as the covering product (3), the surface tension of the first varnish being greater or less than the surface tension of the second varnish, such that the rejection effect is produced between the first and the second varnish.

Figure 5:
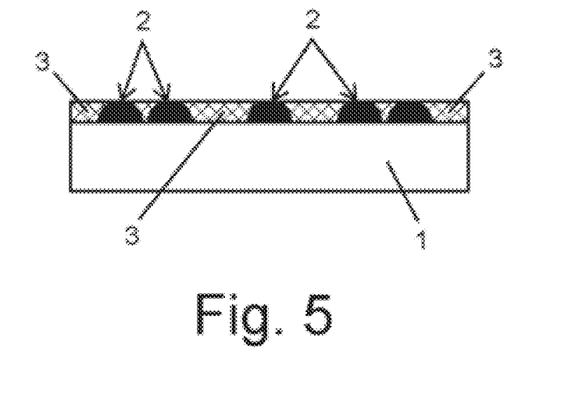
FIG. 5 shows a schematic view of the substrate, according to FIG. 3, wherein it can be seen how both products are reacting with each other.

FIG. 5 shows the substrate (1) at a time when the reactions derived from the interaction of the covering product (3) with the relief product (2) are taking place, having surface tension values clearly different from each other. In this case, FIG. 5 shows a moment in the generation of the reactions starting from FIG. 3, in other words, according to the first measurement of the level of application of the covering product (3), although it could also start from FIG. 4, in other words, according to the second measurement of application level of the covering product (3).

Figure 7:
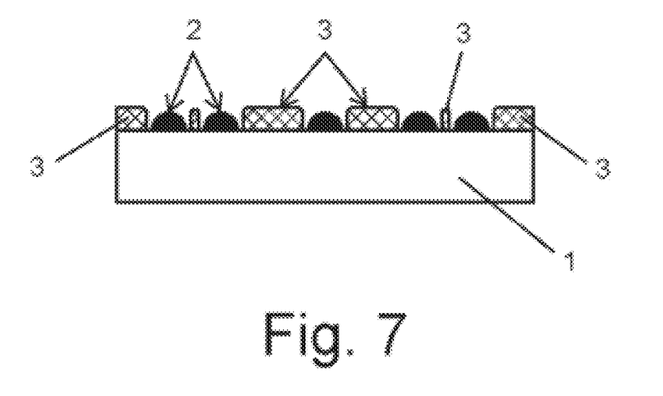
FIG. 7 shows a schematic view of the substrate wherein, after the reaction between the two products, a portion of the layer has been removed in correspondence with the droplets.

The method comprises, as a result of said created reactions, producing the surface (1') of the substrate (1) with the relief product (2) according to the partial selective arrangement, in addition to the covering product (3) according to the portions of the surface (1') free from both the relief product (2) and the rejection effect. FIG. 7 is a representation of what was produced as a result of said generation of reactions.

Figure 8:
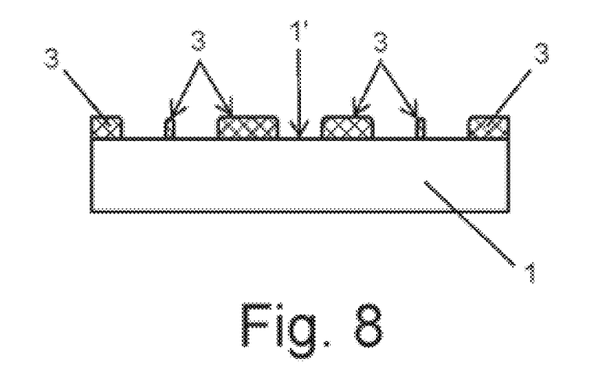
FIG. 8 shows a schematic view of the substrate, according to FIG. 7, wherein additionally the droplets have been removed.

The method may then comprise the step of removing the relief product (2), as represented by FIG. 8. This step is optional since, depending on the relief or the three-dimensional structure to be produced on the final substrate (1) produced, it may be convenient to remove it or maintain it.

When the method comprises or applies the step of removing the relief product (2) after the described generation of reactions, said method comprises two pathways to do so, mainly depending on the features of the relief product (2): a) application of energy in the form of heat and b) applying a blowing, brushing, etc., in other words, a physical or mechanical process. When the relief product (2) is removed, some volumetric spaces corresponding to the gaps it occupied remain free, with which the textured or three-dimensional structure to be produced will have been formed.

Pathway a) implies that the removal of the relief product (2) is carried out, preferably, by applying a radiation, which for example can be UV, UV-LED, Eb, hot air, infrared, etc. The removal of the relief product (2) is determined according to pathway a) based on the chemical features thereof such that the removal thereof is caused by evaporation. In other words, depending on the relief product (2) chosen in the method, it (2) is dried through pathway a) or pathway b). In a parallel manner, applying pathway a) can cause the gelling or partial drying of the covering product (3).

Likewise, the method comprises choosing the relief product (2) depending on the substrate (1), with or without the print and with or without the preparation layer, and the features to be produced in the final substrate (1) produced. By way of examples, if the substrate (1) is a parquet, UV-drying varnishes would be used as the relief product (2), if the substrate (1) is cardboard, water-based varnishes would be used for the drying thereof by means of hot air as the relief product (2) and if the substrate (1) is made of PVC, a UV varnish would be used as the relief product (2), the covering product (3) being a UV drying varnish.

In an alternative or complementary manner to allowing the generation of reactions and the subsequent removal of the relief product (2) as described, the method comprises selecting the relief product (2) and the covering product (3) such that they include properties which favour the drying or curing of one of the products (2, 3) before the other (2, 3).

Specifically, the relief product (2) is selected including properties to equip it with a delaying effect in the drying thereof, for example by UV. In this manner, the step of removing the relief product (2) takes place, first producing the drying, curing, gelling or solidification only of the covering product (3) and afterwards the removal of the relief product (2) according to one of the two pathways a) or b) described previously. According to this, the covering product (3) is applied such that the relief product (2) is removable, preferably by means of direct access from the outside. Therefore, the covering product (3) is preferably applied according to the second level measurement.

Figure 6:
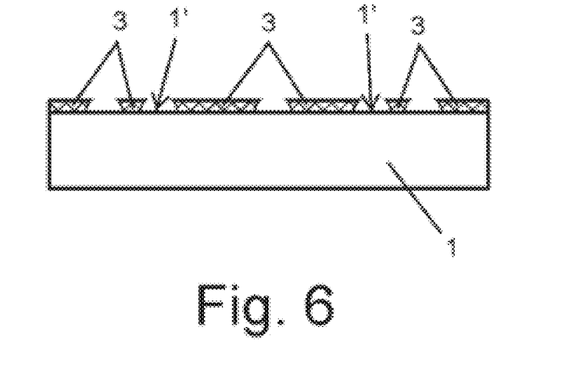
FIG. 6 shows a schematic view of the substrate, according to FIG. 4, wherein it can be seen how the droplets have been removed.

In this manner, the volumetric spaces occupied by the droplets of the relief product (2) are defined, which remain free or empty such that the slits or recesses are determined. FIG. 6 represents the result produced according to what is described.

As can be derived from the comparison of the results which can be seen between FIGS. 6 and 8, the properties which make the products (2, 3) immiscible with each other and the properties with a delaying effect in the drying such that one of the products (2) is dried or cured before the other (3) as described, give rise to producing different shapes in the relief or the three-dimensional structure on the surface (1') of the substrate (1) to be finally produced.

After producing the result which can be seen in any one of FIGS. 6 to 8, depending on the removal, or not, in one manner or another of the relief product (2), or even after the combination of the generation of reactions and of the delaying effect in the drying of the relief product (2), the method comprises applying a protective product (4). The protective product (4) is preferably a UV-curing varnish, although alternatively it can be a water-based varnish or a solvent-based varnish.

Thus, the application of the protective product (4) takes place after the fixing, drying or curing of the covering product (3), the slits or the recesses which determine the relief or the three-dimensional structure being defined.

Figure 9:
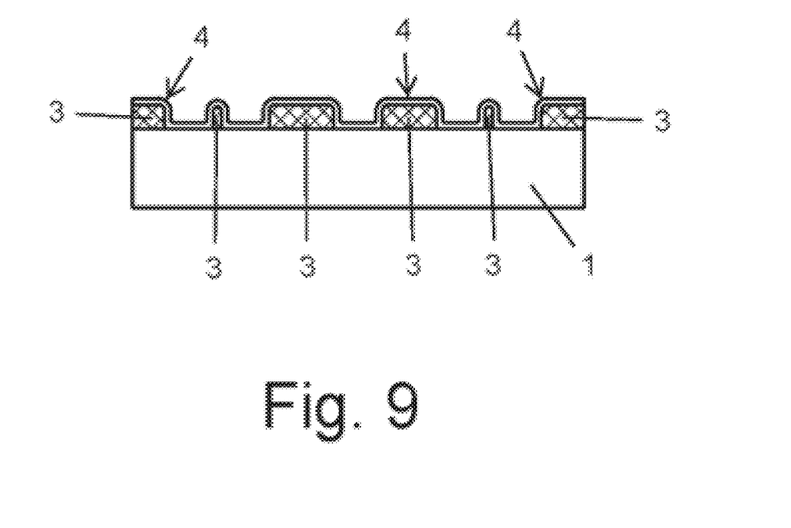
FIG. 9 shows a schematic view of the substrate wherein another layer of another additional product has been applied on the surface of the area of the remaining layer.

The application of the aforementioned protective product (4) gives as a final result a protective layer to the result of the process, the relief which has been formed by implementing the present method being perfectly reproduced. This is represented in FIG. 9, in this case according to the previous result shown through FIG. 8.

In order to apply said protective product (4), means for applying it are preferably used, such as preferably a rubber roller formulated so that it adapts to the relief, normally with a Shore hardness of less than or equal to 20-25. Additionally or alternatively, a spray gun can be used.

Next, the method comprises fixing or curing the protective product (4), and more specifically the protective layer of the protective product (4). The protective product (4), in addition to the relief product (2) and the covering product (3), is completely or at least partially dryable or curable such that it reaches a solid state or at least a semi-solid or gelling state. This curing, which is usable for any of said three products (2, 3, 4), is able to be performed by applying energy through a technology that can be selected from ultraviolet radiation, UV-LED radiation, infrared radiation, hot air and others which use similar radiation.

Additionally, the method may comprise using accelerators for the drying, for example, photoinitiators for the UV drying, such that the times of this fixing step of the relief product (2), the covering product (3) and/or the protective product (4) are shortened.

In this manner, depending on the substance or composition of the relief product (2), it is removable or hardenable in order to be maintained when energy is applied to it, such as ultraviolet radiation, UV-LED radiation, Eb radiation, infrared radiation and hot air.

When the relief product (2) is a varnish, depending on the composition thereof, it can be dried by means of radiation (UV, UV-LED, Infrared) or by means of physical drying (hot air). When the relief product (2) is a silicone, it may require a "mechanical" removal, such as through a blowing or a brushing instead of applying the aforementioned radiations or the hot air.

As described, the device used to produce the substrate (1) through the method additionally comprises first fixing means for fixing or drying the relief product (2) and/or second fixing means for fixing or drying the covering product (3), in addition to third fixing means for fixing or drying the protective product (4).

Additionally, said device additionally comprises a control unit configured to apply the present method as described.

The invention claimed is:

1. A method for producing a three-dimensional structure on a surface of a flat substrate, comprising the following steps:
   providing the substrate with the surface ready to be treated;
   applying a relief product in the form of droplets on the surface by digital printing, such that selected areas of droplets are produced on the surface;
   applying a covering product to the surface such that it forms a layer over the surface;
   fixing the layer of the covering product with the selected areas on the surface being free from the covering product, thereby obtaining a three-dimensional structure on the substrate;
   wherein the relief product comprises properties which provide a delaying effect in the drying such that the drying time of the relief product is greater than that of the covering product, wherein the covering product experiences a first change comprising one of drying or curing before the relief product experiences a second change comprising one of drying or curing.

2. The method according to claim 1, wherein energy is applied by carrying out the fixing by drying the layer of the covering product.

3. The method according to claim 1, wherein the relief product and the covering product comprise properties such that they are immiscible with each other in order to generate a removal of the covering product in correspondence with the droplets of the relief product.

4. The method according to claim 1, wherein after the fixing of the layer of the covering product, the relief product is maintained on the surface.

5. The method according to claim 1, wherein after the fixing of the layer of the covering product, the relief product is removed.

6. The method according to claim 5, wherein the relief product is removed through a brushing or an application of compressed air.

7. The method according to claim 1, wherein during the fixing of the layer of the covering product, the relief product is removed.

8. The method according to claim 1, wherein the layer of the covering product being fixed, a protective product is applied on the surface.

9. The method according to claim 8, wherein a fixing of the protective product is carried out.

10. The method according to claim 1, wherein the relief product is selected from ink, silicone, varnish, lacquer, water-based liquid, solvent-based liquid and any combination of the above.

11. The method according to claim 1, wherein the relief product is applied by use of injection heads.

12. The method according to claim 1, wherein the covering product is lacquer or varnish.

13. A method for producing a three-dimensional structure on a surface of a flat-substrate, comprising the following steps:
    providing the substrate with the surface-ready to be treated;
    applying a relief product in the form of droplets on the surface by digital printing, such that selected areas of droplets are produced on the surface;
    applying a covering product to the surface such that it forms a layer over the surface;
    fixing the layer of the covering product with the selected areas on the surface being free from the covering product, thereby obtaining a three-dimensional structure on the substrate;
    wherein the relief product comprises properties which provide a delaying effect in the drying such that the drying time of the relief product is greater than that of the covering product,
    wherein the covering product experiences one of drying or curing and the relief product does not experience any drying or curing.

14. The method according to claim 13, wherein after the fixing of the layer of the covering product, the relief product is removed.

* * * * *